United States Patent [19]

Brown

[11] 4,378,872
[45] Apr. 5, 1983

[54] ARTICLE HANDLING APPARATUS

[75] Inventor: William L. Brown, Easton, Pa.

[73] Assignee: SI Handling Systems, Inc., Easton, Pa.

[21] Appl. No.: 968,931

[22] Filed: Dec. 13, 1978

Related U.S. Application Data

[63] Continuation of Ser. No. 781,617, Mar. 28, 1977, abandoned.

[51] Int. Cl.³ .............................................. B65G 37/00
[52] U.S. Cl. .................................... 198/570; 198/746; 198/748; 221/124; 221/130; 221/279
[58] Field of Search ................. 198/435, 732, 746–748, 198/570; 221/124, 129–131, 227, 279, 123; 74/229, 230.5, 243 C, 243 R; 414/257

[56] References Cited

U.S. PATENT DOCUMENTS

| | | | |
|---|---|---|---|
| 1,877,050 | 9/1932 | Ray | 221/130 |
| 3,026,737 | 3/1962 | Berg | 74/230.5 |
| 3,329,255 | 7/1967 | Dulieu | 198/732 |
| 3,348,732 | 10/1967 | Schwarz | 221/279 |
| 3,390,907 | 7/1968 | Pulda | 198/746 |
| 3,624,792 | 11/1971 | Lipfert | 221/129 |
| 3,881,633 | 5/1975 | Bradt | 221/123 |
| 4,129,229 | 12/1978 | Brown | 221/129 |

Primary Examiner—Joseph E. Valenza
Attorney, Agent, or Firm—Seidel, Gonda, Goldhammer & Panitch

[57] ABSTRACT

An article handling apparatus including a generally vertical plate is disclosed for contacting and pushing articles along a generally horizontal surface. The plate is connected to a movable endless cable which is carried about the periphery of a pair of spaced wheels. A hollow dividing rail is supported upon the horizontal surface. In the preferred embodiment, a plurality of dividing rails are supported on the surface and divide the surface into a plurality of lanes. A pair of said wheels are rotatably mounted within each hollow rail adjacent opposite longitudinal ends thereof.

6 Claims, 6 Drawing Figures

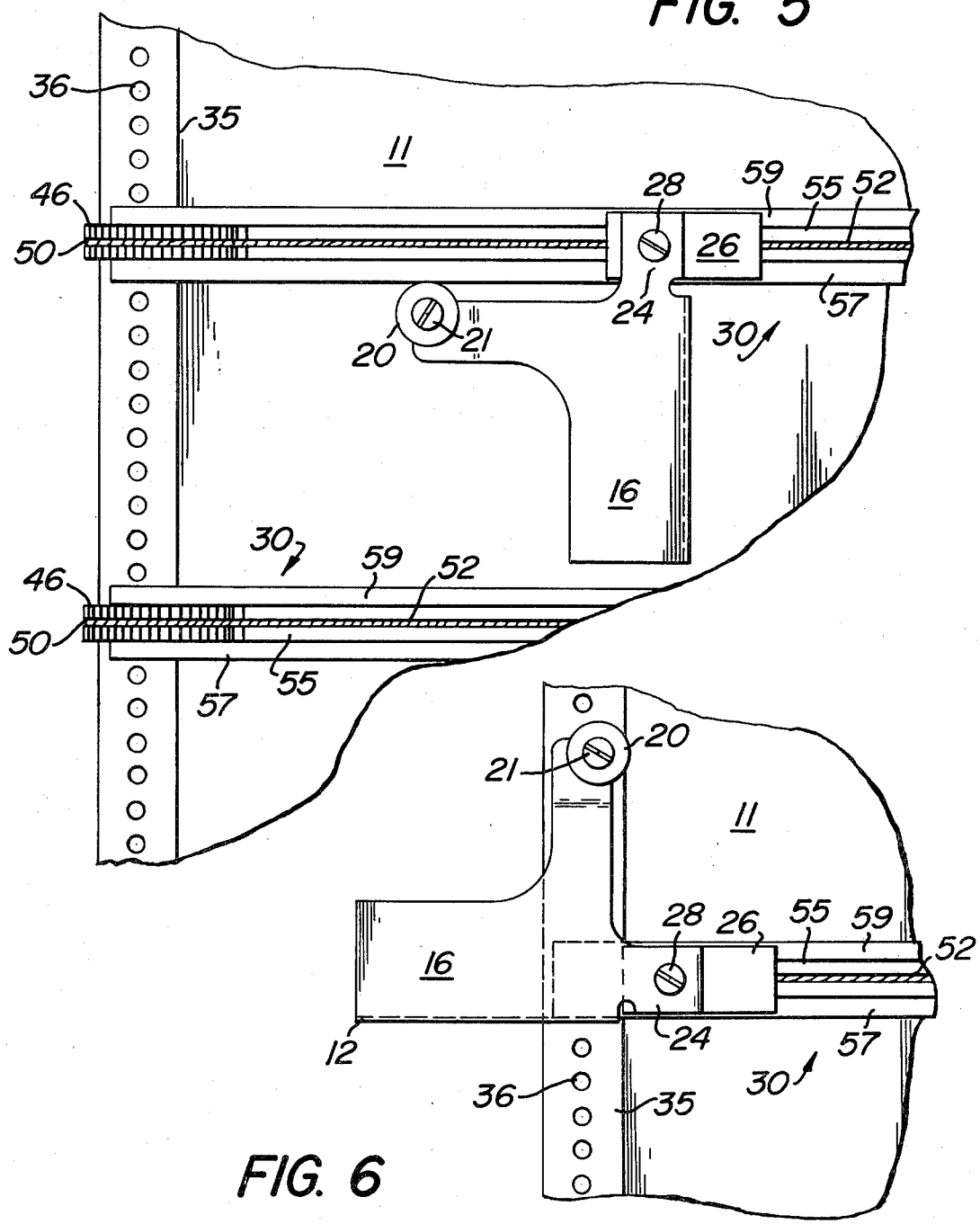

ARTICLE HANDLING APPARATUS

This is a continuation of application Ser. No, 781,617, filed Mar. 28, 1977.

BACKGROUND OF THE INVENTION

The apparatus of the present invention is concerned generally with the moving and dispensing of articles supported on horizontal shelves. The apparatus of the present invention is intended for use in article dispensing apparatus such as disclosed in U.S. Pat. Nos. 3,348,732; 4,113,119 and 4,129,229.

SUMMARY OF THE INVENTION

The article handling apparatus of the present invention is adapted to move articles along a generally horizontal surface. The apparatus includes a means for contacting a surface of articles to be moved and a means for moving the contacting means. The contacting means is movable along a path between a forward and a rear position. A means is provided for pivoting the contacting means out of the path. During pivoting of the contacting means, the contacting means remains engaged to the moving means.

In the preferred embodiment, the contact means includes a vertically disposed plate and the moving means includes a movable endless cable. Hollow dividing rails are supported on the horizontal surface and divide the horizontal surface into a plurality of lanes or paths along which the articles are moved. A pair of wheels are supported for rotary motion within each rail. The rotatable wheels are disposed adjacent opposite longitudinal ends of each rail and an endless cable is carried about the periphery of a pair of wheels within a rail. A portion of each wheel extends beyond a longitudinal end of its rail and is adapted to engage with a motive power source. The plate is pivotably connected to the endless cable and has an arm extending rearwardly therefrom.

Articles to be moved by the apparatus of the present invention are arranged within a lane in a row and abutting one another. In order to dispense the articles, the plate is moved forwardly, contacts the rearmost article and pushes the entire row of articles forward. The articles to be dispensed are thereby pushed over the forward edge of the horizontal supporting surface. The arm, by contacting a vertical surface of the rails, prevents the rotation of the plate while the plate is pushing the articles.

In its rearmost position, the arm of the plate extends beyond the rearmost portion of the rail and thus permits the plate to be pivoted out of the lane in which the plate is adapted to push articles. In this manner, clear access to the rear of the lane is attained and the lane can be replenished with articles to be dispensed.

It is an object of the present invention to provide a mechanism for pushing articles along a horizontal surface to dispense the articles therefrom.

It is another object of the invention to provide a pushing mechanism which facilitates the reloading of lanes from which articles are being dispensed.

Other objects will appear hereinafter.

BRIEF DESCRIPTION OF THE DRAWINGS

For the purpose of illustrating the invention, there is shown in the drawings a form which a presently preferred; it being understood, however, that this invention is not limited to the precise arrangements and instrumentalities shown.

FIG. 5 is a top plan view illustrating the pushing mechanism adjacent its rearmost position.

FIG. 6 is a top plan view illustrating the pushing mechanism at its rearmost position and pivoted out of its article dispensing lane.

DETAILED DESCRIPTION OF THE INVENTION

Figure 1:
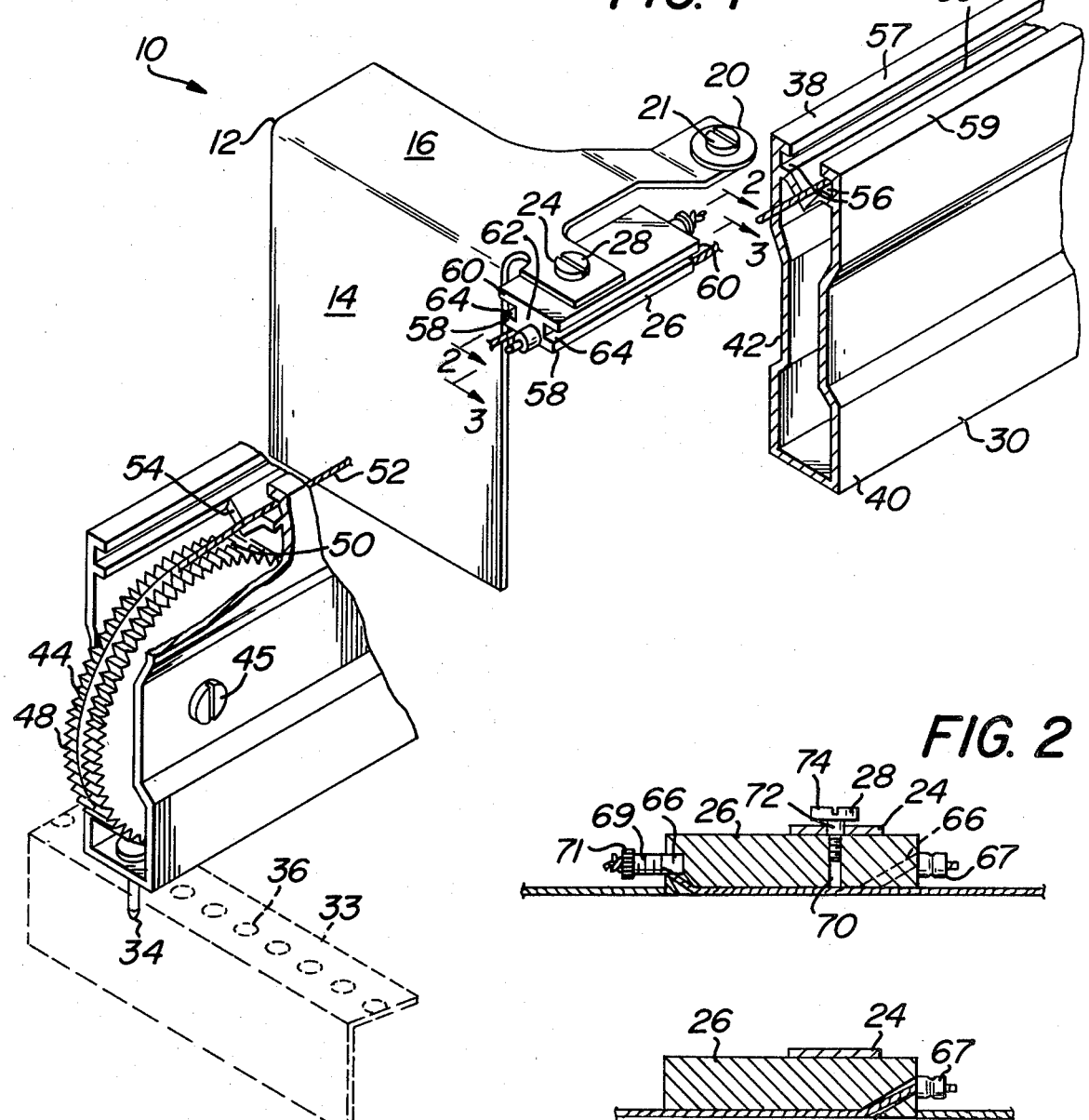
FIG. 1 is a perspective view of an article pushing mechanism in accordance with the present invention, portions thereof being broken away.
Figure 2:
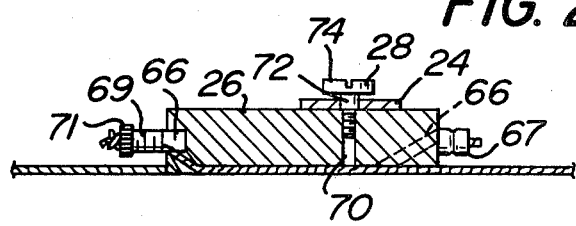
FIG. 2 is a sectional view taken along line 2—2 of FIG. 1.
Figure 3:
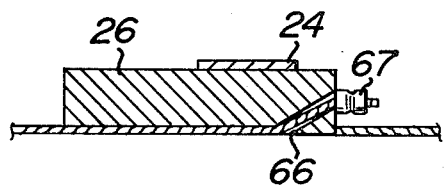
FIG. 3 is a sectional view taken along line 3—3 of FIG. 1.

Referring to the drawings in detail, wherein like numerals indicate like elements, there is shown in FIG. 1 an article handling apparatus in accordance with the present invention designated generally as 10. The apparatus 10 includes a generally horizontal surface 11 for supporting articles and a pushing plate 12 for contacting and pushing the articles to dispense the articles from the surface 11.

The plate 12 has a vertical face 14 which serves as the contact surface with the articles being dispensed. The face 14 is directed forwardly in the direction in which the articles will be dispensed. Extending rearwardly from the face 14 is an arm 16. The arm 16 carries a roller 20, which is rotatable about an axle 21. The purpose of the roller 20 will be explained hereinafter. An extension 24 extends from one side of the arm 16. A connecting block 26 is pivotably mounted to the extension 24 by a screw 28.

A hollow dividing rail 30 is supported on the generally horizontal surface 11. A front flange 33 is attached along the forward edge of surface 11 and a back flange 35 is attached along the rear edge of surface 11. The flanges 33, 35 have a plurality of holes 36 extending through their horizontal surfaces. The rail 30 is secured to the surface 11 by bolt 34. A bolt 34 passes through a hole in the forward portion of the rail 30 and extends into a hole 36 within the front flange 33. Similarly, a bolt 34 passes through a hole in the rear portion of the rail 30 and extends into a hole 36 in the rear flange 35. The position of the rail 30 along the surface 11 can be adjusted by securing a rail 30 in engagement with a different pair of holes 36.

The rail 30 has the general configuration of a hollowed I-beam with an enlarged top section 38, an enlarged bottom section 40 and a narrowed central section 42. A forward gear wheel 44 is rotatably carried within the rail 30 adjacent its forward longitudinal end and a rear gear wheel 46 is carried within the rail 30 adjacent its rear longitudinal end. The wheels 44, 46 are disposed within a rail 30 such that a portion of each wheel 44, 46 extends beyond a longitudinal end of the rail 30. The wheels 44, 46 are rotatably carried by axles 45, which pass through the narrowed central section 42. Only the forward axle 45 is shown in the drawings. A similar axle 45 rotatably carries the rear gear wheel 46.

The wheels 44, 46 each have a plurality of gear teeth 48 along their circumferences. The teeth 48 are bifurcated by a V-shaped groove 50 located in the center of the circumferential face of the wheels 44, 46. An endless cable 52 is supported within the grooves 50 of the forward and rear wheels 44, 46. The endless cable 52 is supported by the wheels 44, 46 will move the cable 52, which in turn will rotate the other wheel 44 or 46.

A V-shaped support 54 is located within the top section 38. The support 54 provides rigidity for the rail 30. The V-shaped support 54 extends along substantially the entire longitudinal length of the rail 30. The support 54 does not extend into the areas occupied by the wheels 44, 46. The top section 38 has a pair of top surfaces 57, 59 which are separated by a slot 55. The slot 55 extends along the entire length of the rail 30. A pair of channels 56 are located within the top section 38 between the support 54 and the surfaces 57, 59.

The connecting block 26 includes a pair of lower flanges 58 and a pair of upper flanges 60. The lower flanges 58 are interconnected with the upper flanges 60 by a central section 62. The upper and lower flanges 58, 60 define between them a pair of grooves 64. The lower flanges 58 are slideably received within the channels 56. The central section 62 fits within the slot 55 and the upper flanges 60 are slideable above the surfaces 57, 59.

A pair of holes 66 pass through the connecting block 26. The holes 66 extend from the central section 62 at opposite longitudinal ends of the block 26 through to the lower surface of the block 26. The holes 66 are disposed at an acute angle with respect to the bottom surface of the connecting block 26. The endless cable 52 passes through one of the holes 66, then passes along the bottom surface of the block 26 and thereafter through the other hole 66. The endless cable 52 is formed by passing one end of the cable through one of the holes 66 and attaching thereto a pressure lug 67 which prevents the cable from being withdrawn. The other end of the cable is then passed around the front and rear wheels 44 and 46 and in the grooves 59 and then passed through the other hole 66, through a hole in bolt 69 and another pressure lug 71 is attached to the end of the cable 52 extending out of the bolt 69. Bolt 69 is turned counterclockwise to increase the tension in the cable and to increase the friction between the cable and the V-shaped groove in the wheels 44 and 46.

The plate 12 is pivotably connected to the block 26 by the screw 28. The screw 28 threads into a threaded hole 70 within block 26. An unthreaded portion 72 of the screw 28 screws down upon the upper surface of the block 26. The portion 72 has an axial length greater than the thickness of extension 24. In this manner, the head 74 of the screw 28 does not tighten down upon the extension 24. The plate 12 is thereby free to pivot about the screw 28. The roller 20 is provided to prevent the rotation of the plate 12 when the plate 12 is being used to push articles along the surface 11. Articles being pushed by the apparatus 10 contact the vertical face 14 and are pushed in the direction toward the forward wheel 44. Due to the pressure upon face 14, the plate 12 tends to rotate in a clockwise direction about the screw 28, as seen in FIG. 1. The roller 20, however, contacts the outer vertical surfaces of the top section 38 to prevent such rotation.

In the preferred embodiment, a plurality of rails 30 are supported on the surface 11 and define between them a plurality of lanes. The width of the lanes is determined by the size of the articles to be stored therein.

As seen in FIG. 5, the plate 12 has a width substantially equal to the distance between adjacent rails 30. Such a relationship between the width of the plate 12 and the distance between adjacent rails 30 is desirable irrespective of the distance between adjacent rails 30.

Since the distance between adjacent rails 30 will vary in accordance with the size of articles being stored in a lane, the plate 12 is constructed in various sized widths. Plate 12 is easily interchanged by removing the screw 28 from the connecting block 26, placing the desired plate 12 into position and securing the plate 12 to the block 26 with the screw 28.

The articles within a lane are arranged in a row such that adjacent articles are in contact with one another. Whenever an article is to be dispensed from a lane, the front gear wheel 44 is engaged by a suitable driving mechanism, such as disclosed in my copending patent application Ser. No. 763785 filed Jan. 31, 1977, now U.S. Pat. No. 4,129,229, which rotates the wheel 44 in a counterclockwise direction. The plate 12 thus contacts the rearmost article and pushes the articles in the direction of the wheel 44. The roller 20 prevents the rotation of the plate 12 due to the pressure of the articles upon the face 14. The wheel 44 is rotated until a desired number of articles are pushed off of the surface 11 to a suitable collection mechanism.

Figure 4:
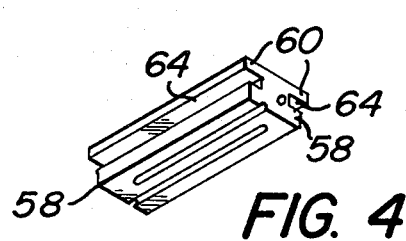
FIG. 4 is a perspective view of the connecting block.

Whenever additional articles are to be placed within a lane, the plate 12 is moved to its rearmost position shown in FIG. 4. Any suitable drive mechanism can be used to engage the rear gear wheel 46 in order to move the plate 12 to its rearmost position. As shown in FIG. 6, when the plate 12 is in its rearmost position, the arm 16 extends beyond the rearmost longitudinal end of the rail 30. The entire plate 12 is thus free to pivot out of its lane to the position shown in FIG. 4 in which the face 14 is generally parallel to the rail 30. A plurality of articles can thereafter be slid into the lane by any suitable means such as the loading mechanism of my copending application Serial No.

The present invention may be embodied in other specific forms without departing from the spirit or essential attributes thereof and, accordingly, reference should be made to the appended claims, rather than to the foregoing specification as indicating the scope of the invention.

I claim:

1. Article handling apparatus for pushing articles comprising a horizontally disposed shelf, spaced dividers on said shelf dividing the upper surface of said shelf into parallel lanes, said dividers having a rear end portion and a forward end portion, pusher means having a vertically disposed face for pushing articles along one of said lanes, said face extending generally perpendicular from the divider adjacent the lane in which the face is disposed, endless means supported by said divider for reciprocating said face along the lane in which it is disposed between a rear position adjacent said divider rear end position and a forward position, connecting means for connecting one end of said pusher means to a top run of said endless means so that said pusher means is pivotable about a vertical axis passing through said connecting means, a wheel supported by each end portion of said divider, at least the wheel at the rear end portion of said divider having a peripheral driving surface which is at least partially exposed so that it may be contacted by a drive means, said endless means extending around a portion of each wheel, said pusher means being pivotable only in its rear position from an article contacting position in its associated lane to a loading position wherein a major portion of said face projects beyond the longitudinal end of said divider and is generally parallel to a vertically disposed plane passing through the lengthwise dimension of said divider, and means to prevent said face from pivoting out of contact with an article when said face is in its associated lane and spaced from its rear position.

2. Apparatus in accordance with claim 1 wherein said divider is a hollow rail member having a V-shaped support for providing rigidity for the rail member and extending along a major portion of the longitudinal interior of said rail member and said connecting means being slideably guided by the top end of said rail member.

3. Apparatus in accordance with claim 1 wherein a portion of said pusher means overlies said connecting means and has a hole extending therethrough, faster means securing said overlying portion to said connecting means.

4. Apparatus in accordance with claim 1 wherein said last mentioned means includes an arm extending generally rearwardly from said face, said arm extending generally parallel to said divider and having a wheel thereon for rolling contact with a portion of said divider.

5. Apparatus in accordance with claim 1 wherein said peripheral driving surface of said wheel includes gear teeth, the teeth on said wheel being bifurcated by a V-shaped groove along the peripheral surface of said wheel, said endless means being a cable disposed within said groove.

6. Apparatus in accordance with claim 1 wherein said divider is hollow and has a cross section whereby the top and bottom portions have a greater transverse dimension than the central portion thereof, said wheels being journaled on axles supported by said central portion, and said endless means passing through said top and bottom portions.

* * * * *